United States Patent
Huntington

(10) Patent No.: US 6,699,767 B1
(45) Date of Patent: Mar. 2, 2004

(54) MANUFACTURE OF SOLID STATE CAPACITORS

(75) Inventor: David Huntington, Bovey Tracey (GB)

(73) Assignee: AVX Limited (GB)

( * ) Notice: Subject to any disclaimer, the term of this patent is extended or adjusted under 35 U.S.C. 154(b) by 0 days.

(21) Appl. No.: 09/831,174

(22) PCT Filed: Oct. 28, 1999

(86) PCT No.: PCT/GB99/03566
§ 371 (c)(1), (2), (4) Date: Jul. 16, 2001

(87) PCT Pub. No.: WO00/28559
PCT Pub. Date: May 18, 2000

(30) Foreign Application Priority Data

Nov. 6, 1998 (GB) .............................................. 9824442

(51) Int. Cl.⁷ ............................................... H01L 21/20
(52) U.S. Cl. ....................... 438/396; 438/399; 438/610; 361/327; 361/328; 361/301.3; 361/301.4; 361/303
(58) Field of Search .................... 29/25.03; 361/529, 361/321, 328, 301.3, 301.8, 303; 438/396, 610, 399, 321

(56) References Cited

U.S. PATENT DOCUMENTS 4,599,788 A * 7/1986 Love et al. ................. 29/25.03
5,357,399 A * 10/1994 Salisbury ..................... 361/529
6,040,229 A * 3/2000 Kuriyama ................... 438/396

* cited by examiner

Primary Examiner—George Fourson
Assistant Examiner—Julio J. Maldonado
(74) Attorney, Agent, or Firm—Dority & Manning

(57) ABSTRACT

The present invention concerns the field of solid state capacitors and relates particularly to massed production methods for manufacturing solid state capacitors. According to one aspect of the present invention there is provided a method of manufacturing multiple solid state capacitors comprising: providing a metal substrate layer (10); forming on an upper surface of the substrate layer a plurality of upstanding bodies (16) consisting of porous sintered valve-action metal; forming a dielectric layer on the bodies; forming a cathode layer on the dielectric layer; coating a top end of each upstanding body with at least one conducting intermediary layer (27, 21) by liquid or vapour phase deposition or by application of an immobilized flowable composition such as a solidifiable paste, thereby to form an intimate physical contact between the cathode layer and the intermediate layer, encapsulating side walls of each body with an electrically insulating material (24); and dividing the processed substrate into a plurality of individual capacitor bodies each having a sleeve of encapsulating material, an anode terminal surface portion at one end consisting of exposed substrate (23) and a cathode terminal surface portion at the other end consisting of exposed intermediary layer (21).

15 Claims, 2 Drawing Sheets

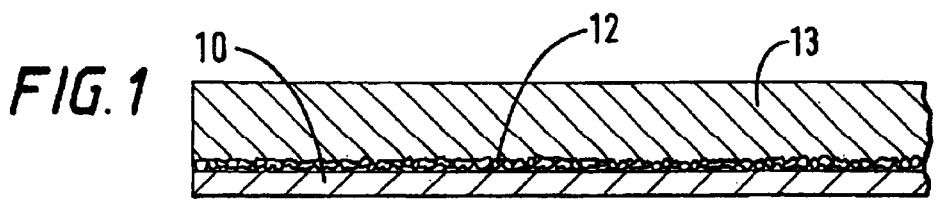
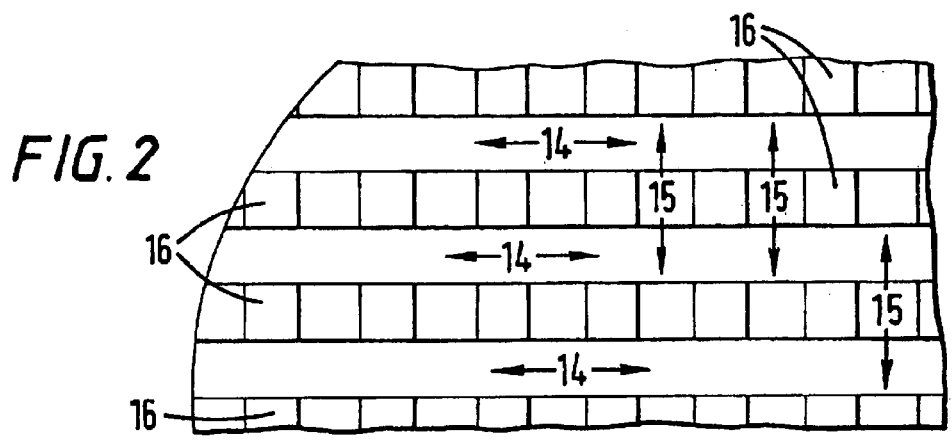
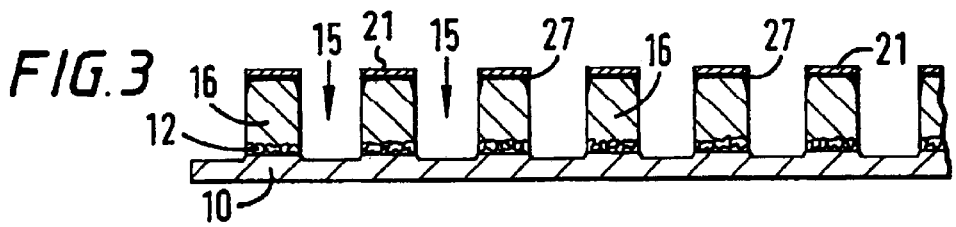
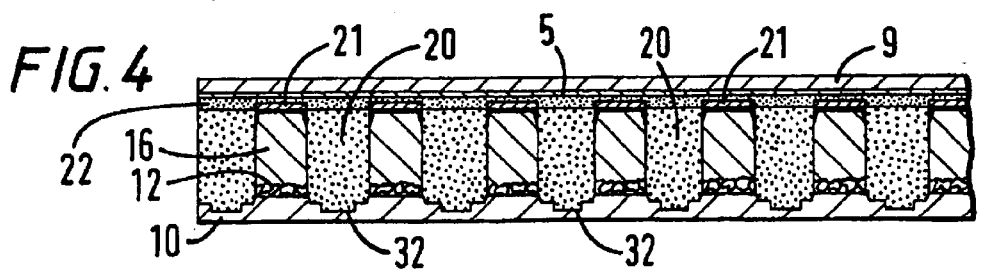
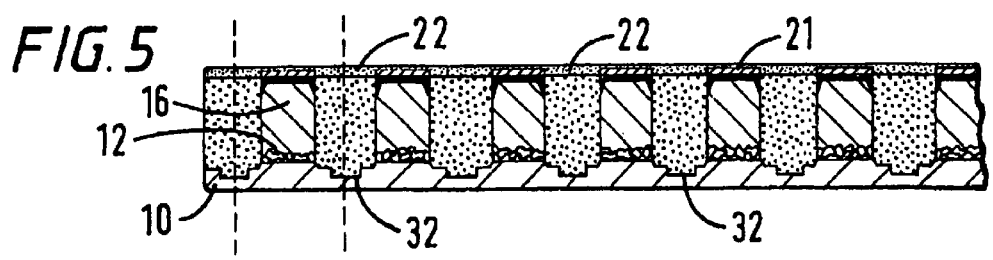

US 6,699,767 B1

MANUFACTURE OF SOLID STATE CAPACITORS

FIELD OF THE INVENTION

The present invention concerns the field of solid state capacitors and relates particularly to massed production methods for manufacturing solid state capacitors.

BACKGROUND OF THE INVENTION

A massed production method for solid state tantalum capacitors is described in U.S. patent specification No. 5,357,399 (inventor Ian Salisbury). This method involves providing a substrate wafer of solid tantalum, forming a sintered, highly porous, layer of tantalum on the substrate, sawing the layer of porous tantalum with an orthogonal pattern of channels to produce an array of upstanding porous tantalum rectilinear bodies, anodising the cubes to produce a dielectric layer on the bodies, dipping the bodies in manganese nitrate solution and heating to convert the applied solution to manganese dioxide thereby to form a cathode layer, applying respective conducting layers of carbon and then silver onto top ends of each body, bonding a lid consisting of a wafer of solid metal onto the silver layer; injecting insulating resin material into the channels between bodies constrained by the substrate and lid; and slicing the assembly in a direction perpendicular to the plane of the wafers and along the centre line of each channel thereby to produce a plurality of capacitors in which the anode terminal consists of substrate material, the cathode terminal consists of lid material and the capacitive body consists of the coated porous tantalum body.

This method allows the production of highly compact, reliable capacitors of high volumetric efficiency. However with the continued miniaturization of components demanded by the electronics industry there is pressure to produce even smaller and more efficient capacitors.

SUMMARY OF THE INVENTION

The present invention seeks to provide a novel method for the massed manufacture of solid state capacitors which allows further improvements in volumetric efficiency and/or further miniaturization of capacitors.

According one aspect of the present invention there is provided a method of manufacturing multiple solid state capacitors comprising:

providing a metal substrate layer;
forming on an upper surface of the substrate layer a plurality of upstanding bodies consisting of porous sintered valve-action metal;
forming a dielectric layer on the bodies;
forming a cathode layer on the dielectric layer;
coating a top end of each upstanding body with at least one conducting intermediary layer by liquid or vapour phase deposition or by application of an immobilized flowable composition such as a solidifiable paste, thereby to form an intimate physical contact between the cathode layer and the intermediate layer;
encapsulating side walls of each body with an electrically insulating material; and
dividing the processed substrate into a plurality of individual capacitor bodies each having a sleeve of encapsulating material, an anode terminal surface portion at one end consisting of exposed substrate and a cathode terminal surface portion at the other end consisting of exposed intermediary layer.

By using an intermediary layer as an exposed cathode terminal surface portion it is possible to omit a solid lid layer from the capacitor. This allows a considerable improvement in the volumetric efficiency of the capacitor formed because space previously taken up by the lid in the prior art method can be allocated to the porous valve-action metal.

According to another aspect of the invention the encapsulation process comprises juxtaposing a solid lid on the respective top ends of the anode bodies, introducing the encapsulation material in a liquid phase to occupy any free space between the lid layer and substrate, causing or allowing the encapsulating material to solidify and removing the lid from the top ends, whereby the sidewalls of each upstanding body are encapsulated without contamination of the juxtaposed portions of the top ends of the bodies.

The encapsulation may involve a preliminary stage in which e.g. powdered thermoplastics resin is introduced into the spaces between the upstanding bodies and then melted by heating of the substrate to form a layer of thermoplastic partway up the sides of each body. Preferably this preliminary part-encapsulation is conducted using a resin of different coloration to the main encapsulation resin, thereby providing a visible polarity indication in the final capacitors. Alternatively polarity may be indicated by other marking such as laser etching.

According to yet another aspect of the invention an intermediary layer is coated onto the bodies by applying intermediary layer material onto a surface of the or a lid, followed by juxtaposition of the lid on the anode bodies so that the top ends are contact-coated by transfer of the material from the lid to the respective top ends, and thereafter removing the lid.

A release agent is preferably provided between the lid and body top ends, which agent facilitates removal of the lid after encapsulation. Preferably the release agent comprises a high surface energy polymer layer formed on the lid. One suitable polymer is PTFE. Where contact coating is part of the process, the layer to be coated is applied onto the release agent which is itself applied to the lid.

The intermediary layer material may be applied to the body top ends by screen printing of an immobilized paste of layer material onto the lid.

Preferably pressure is applied to the lid in order to ensure an intimate contact between the lid and the upstanding body ends. In addition where a coating has been applied to the lid, the pressure ensures effective transfer of material from the lid to the body ends.

The intermediary layer may be formed by solidification of a conducting paint or paste. The layers may be applied by dipping into paste solutions.

In a preferred embodiment two intermediary layers are applied by dipping, and a final intermediary layer is applied by contact coating onto the second layer.

In one embodiment, one intermediary layer comprising carbon is coated on the cathode layer and a further intermediary layer comprising silver is coated on the carbon layer.

The capacitor bodies may be formed into useful capacitors by a termination process in which the respective exposed cathode and anode surfaces of each capacitor body are liquid or vapour phase coated with a termination material which facilitates electrical connection of the respective ends of the capacitor to an electric circuit.

The respective terminal coatings may form a cap on each end of the capacitor body, as in the industry-standard five-sided termination processes.

In a preferred embodiments the valve-action metal is tantalum. However other valve-action metals may be used in the process of the present invention. Examples are niobium, molybdenum, silicon, aluminium, titanium, tungsten, zirconium and alloys thereof. Preferred examples are niobium and tantalum.

When the valve action metal is tantalum the substrate is preferably a solid tantalum wafer, thereby ensuring physical and chemical compatibility with the porous metal.

The upstanding anode bodies may be formed by a process which involves pressing a layer of valve-action metal powder onto the substrate and sintering to fuse the powdered particles. Typically a seeding layer of coarse grade powder may have to be applied to the substrate and sintered thereto before finer grade powder is pressed onto the substrate. The coarse grade powder provides mechanical keying ensuring that a strong connection between the substantive porous layer and the substrate is produced. The strong connection is necessary to ensure that separation of the porous layer from the substrate does not occur during subsequent steps in the manufacturing process. The coherent layer of porous valve action metal thereby produced may be machined or otherwise processed to produce the individual anode bodies. The bodies may be formed by machining of a porous sintered layer formed on the substrate. The machining may be by means of orthogonal sawing to form rectilinear bodies.

According to a further aspect of the invention there is provided a capacitor produced by any method hereinbefore described.

According to another aspect of the invention there is provided an electronic or electrical device comprising a capacitor made by any method hereinbefore described.

The dielectric layer may be formed by an electrolytic anodization process in which an oxide film is carefully built up on the surface of the porous sintered anode body. Suitable methods will be known to the person skilled in the art.

The cathode layer may be formed by dipping the anode bodies into a cathode layer precursor solution such as manganese nitrate and then heating to produce a cathode layer of manganese dioxide. Repeated dipping and heating steps may be carried out in order gradually to build up the required depth and integrity of cathode layer.

Typically, during the dipping process the cathode layer will be built up not only on the anode bodies, but also on the exposed tantalum substrate surface between bodies. In order that each cathode-terminal is isolated from its respective anode terminal a further process step may be carried out to remove any cathode layer (and dielectric layer) from the substrate around the anode body. This process may involve a further machining process in which isolation channels are formed between each anode body by removal of a surface layer of substrate. For example, where orthogonal rows have been machined to form rectilinear anode bodies, isolating channels may be machined along the centre lines of the rows and columns between anode bodies. In this way, a step is formed in the perimeter of each capacitors anode body, which step has an uncoated surface, thereby isolating the cathode layer from the exposed anode terminal.

With the application of the cathode layer, the anode body becomes a capacitive body comprising an anode portion consisting of an interconnected matrix of: metal powder; dielectric insulating layer of metal oxide; and a conducting cathode layer of doped oxide.

The encapsulating resin may be applied under pressure or by simple immersion depending upon the suitability and fluidity of the particular resin. Once the resin has set, the resin and substrate may be machined or otherwise cut to separate adjacent capacitor bodies. The encapsulation material may be a plastics resin, such as epoxy.

BRIEF DESCRIPTION OF THE SEVERAL
VIEWS OF THE DRAWINGS

Following is a description by way of example only and with reference to the drawings of one method of putting the present invention into effect.

In the drawings:

FIGS. 1 and 3 to 5 are cross-sectional views of a substrate during processing according to one embodiment of the present invention.

FIG. 2 is a view from above of the substrate after a machining step in the process.

Figure 6:
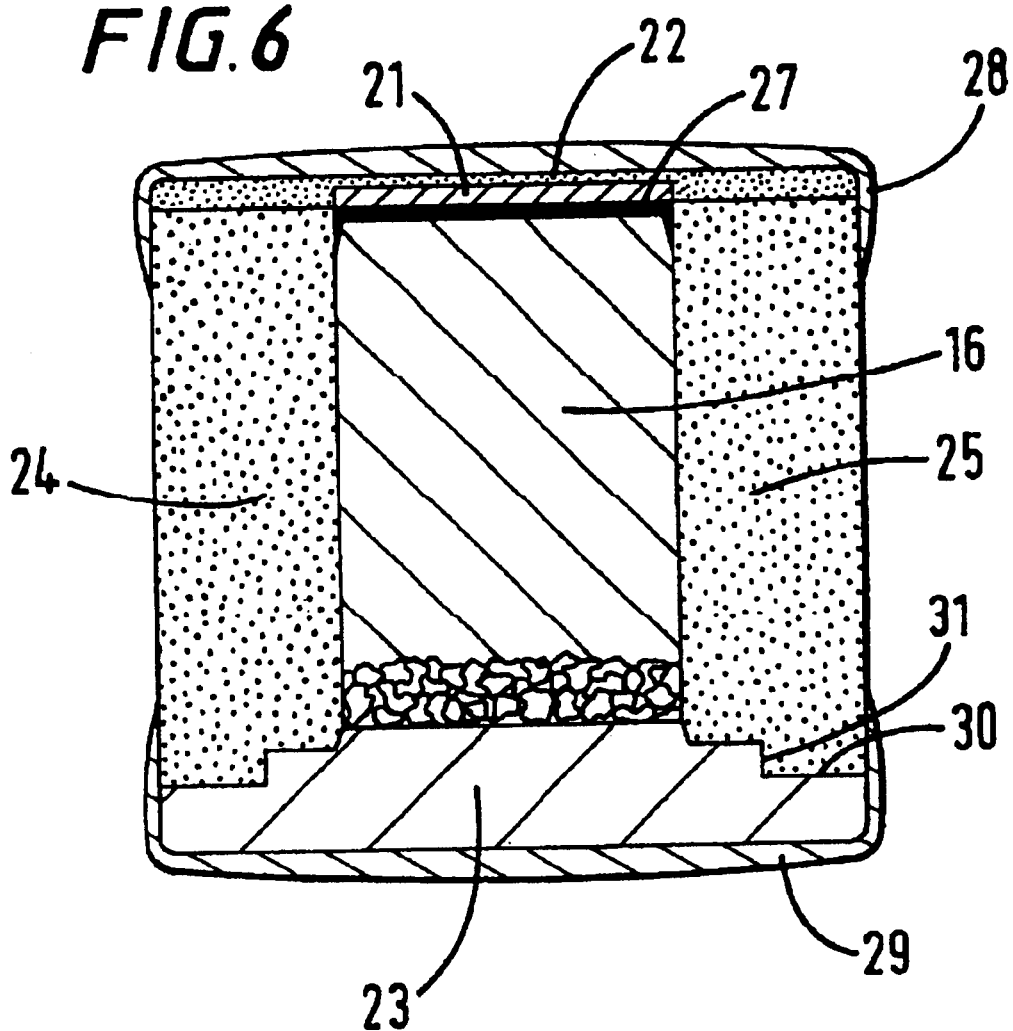
FIG. 6 shows sectional view from one side of a capacitor produced according to the method of the present invention.

DETAILED DESCRIPTION OF THE
INVENTION

A transverse section through a solid tantalum circular wafer is shown as 10 in FIG. 1. An upper surface of the wafer has sintered thereon a dispersion of coarse grained capacitor grade tantalum powder 12. A green (i.e. un-sintered) mixture of fine-grained capacitor grade tantalum powder is then pressed onto the upper surface of the substrate to form a green layer 13.

The green layer is sintered to fuse the fine grained powder into an integral porous network. The sintering is carried out at around 1600 degrees centigrade (the optimum temperature will depend upon the grain size and the duration of the sintering process). The sintering process also fuses the porous layer to the coarse seeding layer 12.

The substrate assembly is then machined to produce an orthogonal grid of transverse channels 14 and longitudinal channels 15 as shown in FIG. 2. The channels are ground using a moving rotating cutting wheel. The channels are cut to a depth just beyond the level of the porous tantalum layer so that the cuts impinge on the substrate, as shown in FIG. 3.

The machining process produces an array of orthogonal section bodies 16 on the substrate. The porous bodies form the anode portions of the capacitors. An insulating dielectric layer (not shown) is applied to the anode bodies by anodizing in an electrolyte bath (of e.g. 0.1% phosphoric acid solution) while connecting the positive terminal of a D.C. power supply to the substrate. This results in the formation of a thin tantalum pentoxide layer on the metal porous surface of the bodies and exposed substrate.

A cathode layer (not shown) is then formed on the anode bodies by the well known manganization process. In this process the anodized anode bodies 16 are immersed in manganese nitrate solution to leave a coating of wet solution on each body and covering its internal porosity. The substrate is heated in moist air to convert the coating of nitrate to the dioxide. The immersion and heating cycles may be repeated as many as 20 times or more in order to build up the required coherent cathode layer.

In order to ensure that any dielectric or cathode layer formed on the substrate surface perimeter of each anode body is isolated, a further machining step is carried out in which an orthogonal pattern of channels 32 is sawn into the substrate surface, along the centre lines separating each anode body.

Once the manganization is complete the manganized bodies are coated with an intermediate layer 27 of conducting carbon by dipping into a bath of liquid carbon paste. After the carbon layer has set, a further intermediate layer 21 of silver is coated onto the carbon layer by dipping of the carbon-coated bodies into a liquid silver paste. The silver layer is not allowed to pass beyond the carbon layer 27 in order to ensure that silver does not directly contact the incompatible oxide layer. The silver layer 21 is then allowed to set solid.

A solid sheet of 9 of tantalum is then coated on one surface thereof with a layer 5 of PTFE as a release agent. A uniform layer of silver paste 22 is then applied to the exposed surface of the PTFE. The sheet is then placed silver-side down onto the top ends of the bodies 16 to from a lid 9 shown in FIG. 4.

Downwards pressure is applied to a top side of the sheet in order to force the immobilized paste 22 to flow into intimate adhesive contact with the intermediate silver layer 21. In addition the contact is further enhanced by the paste flowing to a small extent down the side walls of each capacitor, but not beyond the carbon layer.

With the lid in place, the channels 14,15 between the capacitor bodies are filled with liquid epoxy resin 20 as shown in FIG. 4. The resin surrounds the sides of each capacitor body, up to the level of the lid paste 22. The channels are filled by injection under pressure of the resin, thereby ensuring complete filling of the space defined by the channels. The structural constraint provided by the tantalum lid 9 maintains the integrity of the intermediary layers 27,21 and 22 during the encapsulation process.

When the resin 20 has set, the lid sheet is removed. The PTFE layer 5 readily separates from the set silver layer 22, leaving the upper end region of each body coated in a solid silver layer. The presence of the lid 9 ensures that a flat top surface layer 22 is formed after removal of the lid, as shown in FIG. 5.

The wafer may now be sliced along the centre line (shown as dashed lines in FIG. 5) of each channel 14,15 in order to separate each capacitor body from its neighbours. The resulting individual capacitor structure is shown in FIG. 6. Each capacitor consists of an anode terminal portion 23 consisting of the substrate material. Upstanding from the substrate is the capacitor body 16 which is sheathed in epoxy resin sidewalls 24,25. The step 30,31 in the substrate corresponds to the machine isolation channels 32 formed in the original substrate wafer. This step is free of manganized coating and any other contaminant, and therefore ensures that the exposed anode terminal is isolated from the cathode terminal. The top end region of each capacitor is coated in a layer of carbon paste 27, a layer of silver paste 21 and a further layer of silver paste 22 which forms a cathode terminal portion of the component.

A final processing stage is a five-sided termination process. This is a well known process in the electronics industry which involves the formation of ends caps 28,29 which form the external terminals of the capacitor. The termination layer metal may consist of discrete layers of silver, nickel and tin (preferably in that order). These are suitable metals for forming electrical connections by soldering of the capacitor terminals to contacts or other components of an electrical or electronic circuit.

The present invention is an elegant adaptation of the previous known process which provides a significant improvement in volumetric efficiency of each capacitor. This is achieved by omitting the solid metal lid layer of the prior art process. By omitting the solid metal lid layer the working volume of capacitive valve-action metal forms a much greater proportion of the overall capacitor volume and hence volumetric efficiency is considerably improved.

What is claimed is:

1. A method of manufacturing multiple solid state capacitors comprising:
   providing a metal substrate layer;
   forming on an upper surface of the substrate layer a plurality of upstanding anode consisting of porous sintered valve-action metal;
   forming a dielectric layer on the bodies;
   forming a cathode layer on the dielectric layer;
   coating a top end of each upstanding body with at least one conducting intermediary layer by liquid or vapor phase deposition or by the application of an immobilized flowable composition such as a solidifiable paste, thereby to form an intimate physical contact between the cathode layer and the intermediate layer;
   juxtaposing a solid lid on the respective top ends of the anode bodies;
   encapsulating side walls of each body with an electrically insulating material;
   removing the solid lid from the respective top ends of the encapsulated anode bodies; and
   dividing the processed substrate into a plurality of individual capacitor bodies each having a sleeve of encapsulating material, an anode terminal surface portion at one end consisting of exposed substrate and a cathode terminal surface portion at the other end consisting of exposed intermediary layer.

2. A method as claimed in claim 1, wherein said encapsulating step comprises the steps of:
   introducing the electrically insulating material in a liquid phase to occupy any free space between the solid lid and the substrate layer; and
   causing or allowing the electrically insulating material to solidify before removing the lid from the top ends, whereby the sidewalls of each upstanding body are encapsulated without contamination of the juxtaposed portions of the top ends of the bodies.

3. A method as claimed in claim 1 applying the intermediary layer is coated onto the bodies by applying the intermediary layer material onto a surface of the lid, followed by juxtaposition of the lid on the anode bodies so that the top ends are contact-coated by transfer of the intermediary material from the lid to the respective ends, and thereafter removing the lid.

4. A method as claimed in claim 2 wherein a release agent between the lid and body top ends facilitates removal of the lid.

5. A method as claimed in claim 4 wherein the release agent comprise a polymer layer formed on the lid.

6. A method as claimed in claim 3 wherein the intermediary layer material is applied to the body top ends by screen printing of the layer material onto the lid.

7. A method as claimed in claim 7 wherein pressure is applied to the lid in order to ensure an intimate contact between the lid and the upstanding body ends.

8. A method as claimed in claim 1 wherein an intermediary layer is formed by solidification of a conducting paint or paste.

9. A method as claimed in claim 1 wherein one intermediary layer comprising carbon is coated on the cathode layer and a further intermediary layer comprising silver is coated on the carbon layer.

10. A method as claimed in claim 1 wherein the respective exposed cathode and anode surfaces of each capacitor body are liquid or vapour phase coated with a termination material which facilitates electrical connection of the respective ends of the capacitor to an electric circuit.

11. A method as claimed in claim 10 wherein the respective terminal coatings form a cap on each end of the capacitor body.

12. A method as claimed in claim 1 wherein the valve-action metal is tantalum.

13. A method as claimed in claim 1 wherein the substrate is a tantalum wafer.

14. A method as claimed in claim 1 wherein the bodies are formed by machining of a porous sintered layer formed on the substrate.

15. A process as claimed in claim 1 wherein the encapsulation material is a plastic resin.

* * * * *

UNITED STATES PATENT AND TRADEMARK OFFICE
CERTIFICATE OF CORRECTION

PATENT NO. : 6,699,767 B1
DATED : March 2, 2004
INVENTOR(S) : David Huntington

It is certified that error appears in the above-identified patent and that said Letters Patent is hereby corrected as shown below:

Column 6,
Line 34, insert the word "bodies" between the words "anode" and "consisting".

Column 7,
Line 1, delete the word "applying" and replace with -- wherein --.
Line 12, delete the word "comprise" and replace with -- comprises --.
Line 16, delete "claim 7" and replace with -- claim 2 --.

Signed and Sealed this

Twenty-first Day of September, 2004

JON W. DUDAS
*Director of the United States Patent and Trademark Office*